(12) United States Patent
Ogishima et al.

(10) Patent No.: US 9,729,674 B2
(45) Date of Patent: Aug. 8, 2017

(54) INFORMATION PROCESSING SYSTEM, CLIENTS, SERVER, PROGRAMS AND INFORMATION PROCESSING METHOD

(71) Applicant: FELICA NETWORKS, INC., Tokyo (JP)

(72) Inventors: Jun Ogishima, Tokyo (JP); Hideki Akashika, Tokyo (JP); Naofumi Hanaki, Kanagawa (JP)

(73) Assignee: FELICA NETWORKS, INC., Tokyo (JP)

( * ) Notice: Subject to any disclaimer, the term of this patent is extended or adjusted under 35 U.S.C. 154(b) by 101 days.

(21) Appl. No.: 14/010,584

(22) Filed: Aug. 27, 2013

(65) Prior Publication Data

US 2013/0346489 A1 Dec. 26, 2013

Related U.S. Application Data

(63) Continuation of application No. 11/511,803, filed on Aug. 29, 2006, now Pat. No. 8,561,908.

(30) Foreign Application Priority Data

Aug. 31, 2005 (JP) ................................. 2005-250679

(51) Int. Cl.
*G06F 15/16* (2006.01)
*G06K 5/00* (2006.01)
(Continued)

(52) U.S. Cl.
CPC ............ *H04L 67/42* (2013.01); *G06Q 20/04* (2013.01); *G06Q 20/4037* (2013.01); *G07F 7/08* (2013.01)

(58) Field of Classification Search
CPC ........................... H04L 29/0809; H04L 67/42
See application file for complete search history.

(56) References Cited

U.S. PATENT DOCUMENTS 6,247,644 B1 6/2001 Horne et al.
6,250,557 B1 6/2001 Forslund et al.
(Continued)

FOREIGN PATENT DOCUMENTS

| JP | 2002 123495 | 4/2002 |
| JP | 2003 141063 | 5/2003 |
| JP | A 2005-027215 | 1/2005 |

OTHER PUBLICATIONS

Japanese Office Action dated Dec. 13, 2011.

*Primary Examiner* — Aftab N. Khan
(74) *Attorney, Agent, or Firm* — Haug Partners LLP; William S. Frommer

(57) ABSTRACT

An information processing system including an IC chip, a client driving the IC chip to carry out predetermined processing, a server connected to the client by a communication network, wherein the client has a processing-command requesting section configured to request for transmission of a processing command to the server; an ID-acquisition-command sender section configured to transmit an ID acquisition command; a chip-ID extraction section configured to extract the chip ID; and a processing-command sender section configured to embed the extracted chip ID into the processing command and transmit the command. The server has a command-group sender section configured to send the command. The IC chip has a chip-ID sender section configured to transmit data; a chip-ID determination section configured to determine whether the chip ID in the command is identical with the chip ID of the IC chip; and a processing execution section configured to carry out the predetermined processing.

3 Claims, 10 Drawing Sheets

(51) Int. Cl.
  *H04L 29/06* (2006.01)
  *G06Q 20/04* (2012.01)
  *G06Q 20/40* (2012.01)
  *G07F 7/08* (2006.01)

(56) References Cited

U.S. PATENT DOCUMENTS

| | | | |
|---|---|---|---|
| 6,434,405 B1 | 8/2002 | Sashihara | |
| 6,438,550 B1 | 8/2002 | Doyle et al. | |
| 6,481,621 B1 | 11/2002 | Herrendoerfer et al. | |
| 6,549,773 B1 | 4/2003 | Linden et al. | |
| 6,708,893 B2 | 3/2004 | Erfani et al. | |
| 6,834,795 B1 | 12/2004 | Rasmussen et al. | |
| 6,856,970 B1 | 2/2005 | Campbell et al. | |
| 6,880,084 B1 | 4/2005 | Brittenham et al. | |
| 6,895,502 B1 * | 5/2005 | Fraser | G06Q 20/42 713/168 |
| 7,107,308 B2 | 9/2006 | Madany et al. | |
| 7,111,051 B2 | 9/2006 | Nobakht et al. | |
| 7,117,364 B1 * | 10/2006 | Hepper | G06Q 20/3552 713/168 |
| 7,246,238 B2 | 7/2007 | Mullen et al. | |
| 7,353,281 B2 | 4/2008 | New et al. | |
| 7,376,711 B2 | 5/2008 | Du et al. | |
| 7,421,480 B2 | 9/2008 | Kuo et al. | |
| 7,451,921 B2 | 11/2008 | Dowling et al. | |
| 7,457,878 B1 | 11/2008 | Mathiske et al. | |
| 2001/0000814 A1 | 5/2001 | Montgomery et al. | |
| 2001/0032235 A1 | 10/2001 | Madany et al. | |
| 2001/0039583 A1 * | 11/2001 | Nobakht et al. | 709/227 |
| 2002/0029343 A1 | 3/2002 | Kurita | |
| 2002/0104016 A1 | 8/2002 | Pan et al. | |
| 2002/0124092 A1 * | 9/2002 | Urien | 709/229 |
| 2002/0138549 A1 | 9/2002 | Urien | |
| 2002/0147909 A1 | 10/2002 | Mullen et al. | |
| 2003/0028653 A1 | 2/2003 | New et al. | |
| 2003/0088618 A1 * | 5/2003 | Sueyoshi et al. | 709/203 |
| 2003/0145205 A1 * | 7/2003 | Sarcanin | G06Q 20/02 713/172 |
| 2003/0167229 A1 | 9/2003 | Ludwig et al. | |
| 2003/0217166 A1 | 11/2003 | Dal Canto et al. | |
| 2003/0236984 A2 | 12/2003 | Mullen et al. | |
| 2004/0039847 A1 * | 2/2004 | Persson et al. | 709/250 |
| 2004/0054717 A1 | 3/2004 | Aubry et al. | |

* cited by examiner

INFORMATION PROCESSING SYSTEM, CLIENTS, SERVER, PROGRAMS AND INFORMATION PROCESSING METHOD

CROSS REFERENCES TO RELATED APPLICATIONS

This is a continuation of application Ser. No. 11/511,803, filed Aug. 29, 2006, with a claim of priority under 35 USC 119 to Japanese Application 2005/250679, filed in Japan Aug 31, 2005, the entirety is incorporated herein by reference.

BACKGROUND OF THE INVENTION

1. Field of the Invention

The present invention relates to an information processing system for driving an IC chip to carry out predetermined processing, clients, a server, programs and an information processing method.

2. Description of the Related Art

In place of the magnetic-type cash card and the credit card, which have been used in the past, a large number of IC (Integrated Circuit) chips each including a memory used for storing data electrically and a processing circuit for carrying out processing to store the data is used. The IC chip is normally embedded in an IC tag or an IC card and capable of communicating data with other apparatus by radio communication in a non-contact way. Thus, the IC chip is capable of rendering services exhibiting excellent maintainability and corrosion-proof characteristics to the other apparatus without sacrificing the appearance of the IC card.

Japanese Patent Laid-open No. 2003-141063 discloses a technology of operating such an IC chip (or an IC card) from a client owned by the user through a reader/writer capable of reading out data from the IC card and writing data thereon. Such an IC card can be used as a cash card and a credit card, as well as a prepaid card (or electronic money), an electronic ticket or the like.

In accordance with the technology described above, an access to the IC chip cannot be made directly from the web browser of a client. Instead, a view server is used as a provider of a content and the IC chip communicates with a communication server used as another route. Then, by connecting the view server to the communication server, the IC chip can be operated from the client.

In this technology, all commands relevant to actual processing for operating the IC chip are transmitted from the communication server. Thus, the client intervenes in the processing of the IC chip by merely relaying a command transmitted from the communication server.

SUMMARY OF THE INVENTION

Since all commands relevant to actual processing for operating the IC chip are transmitted from the communication server as described above and all responses from the IC chip have to be given to the communication server in a uniform manner, however, it takes much time to carry out processing even once. In recent years, the amount of data stored in a memory employed in the IC chip shows a trend of increasing and the amount of processing accompanying enhancement of security also shows a trend of rising as well. It is thus desirable to shorten the time absolutely consumed for exchanging information with the IC chip.

In order to solve the problem raised in information exchanges with the IC chip in the related art as described above, inventors of the present invention have provided a new and improved information processing system capable of reducing a load borne by a server and shortening the time it takes to carry out each processing unit, clients employed in the information processing system, a server also employed in the information processing system, programs to be executed by the clients and the server and an information processing method to be adopted by the information processing system.

In order to solve the problem described above, in accordance with an embodiment of the present invention, there is provided an information processing system including an IC chip, a client for driving the IC chip to carry out predetermined processing, and a server connected to the client by a communication network. In the information processing system, the client includes a processing-command requesting section, an ID-acquisition-command sender section, a chip-ID extraction section, and a processing-command sender section. The processing-command requesting section is configured to issue a request to the server as a request for transmission of a processing command to be executed by the IC chip to carry out the predetermined processing. The ID-acquisition-command sender section is configured to pass on an ID acquisition command received from the server as a command for acquiring the chip ID of the IC chip to the IC chip. The chip-ID extraction section is configured to extract the chip ID from data given by the IC chip. The processing-command sender section is configured to embed the chip ID extracted from the response data in the processing command received from the server and transmit the processing command including the embedded chip ID to the IC chip. Also, the server includes a command-group sender section configured to send the processing command and the ID acquisition command with the same timing at the request made by the client as a request for transmission of the processing command to the client. Further, the IC chip includes a chip-ID sender section, a chip-ID determination section, and a processing execution section. The chip-ID sender section is configured to transmit data having the chip ID in response to the ID acquisition command received from the client. The chip-ID determination section is configured to produce a result of determination as to whether or not the chip ID embedded in the processing command received from the client is identical with the chip ID of the IC chip. The processing execution section is configured to carry out the predetermined processing in accordance with the processing command if the result of the determination indicates that the chip ID embedded in the processing command received from the client is identical with the chip ID of the IC chip.

In order to operate the IC chip from the client, first of all, the client establishes a connection with the server and requests the server to issue a processing command to the client through the connection as a command to be eventually pass on to the IC chip. Then, in the information processing system, a process unit of the IC chip needs to be carried out at the following two stages:

(1) a stage of obtaining the chip ID of the IC chip; and (2) a stage of requesting the IC chip to carry out the predetermined processing by issuing the processing command including the obtained chip ID to the IC chip. In the information processing system according to an embodiment of the present invention, the server does not carry out all the processing of the two stages. Instead, the client bears a portion of the load of the server in order to reduce the number of accesses made by the server as accesses to the client and the number of accesses made by the client as accesses to the server.

The information processing system is a confluence including a plurality of apparatus but it is possible to provide the information processing system with a configuration in which there may not specify which apparatus has configuration elements and functional modules. In addition, it is possible to provide the information processing system with a configuration in which each configuration element and every functional module exist as a unit not grouped in an apparatus.

In order to solve the problem described above, in accordance with another embodiment of the present invention, there is provided a client receiving support from a server connected to the client by a communication network in driving an IC chip to carry out predetermined processing. The client includes a processing-command requesting section, an ID-acquisition-command sender section, a chip-ID extraction section, and a processing-command sender section. The processing-command requesting section is configured to issue a request to the server as a request for transmission of a processing command to be executed by the IC chip to carry out the predetermined processing. The ID-acquisition-command sender section is configured to pass on an ID acquisition command received from the server as a command for acquiring the chip ID of the IC chip to the IC chip. The chip-ID extraction section is configured to extract the chip ID from data given by the IC chip. The processing-command sender section is configured to embed the chip ID extracted from the response data in the processing command received from the server and transmit the processing command having the embedded chip ID to the IC chip.

As described above, a process to request an IC chip to carry out predetermined processing is performed at the following two stages:
(1) a stage of obtaining the chip ID of the IC chip; and
(2) a stage of requesting the IC chip to carry out the predetermined processing by issuing the processing command including the obtained chip ID to the IC chip. By virtue of a configuration having the chip-ID extraction section and the processing-command sender section, the processing command can be transmitted to the IC chip without the need to again make an access to the server.

It is possible to provide the information processing system with a configuration in which ID location information showing the location of the chip ID in the response data received by the server from the IC chip is included in the ID acquisition command issued by the server. In this case, the ID extraction section extracts the chip ID from the response data on the basis of the ID location information. In addition, it is possible to provide the information processing system with a configuration in which the ID location information includes the position of the start of the chip ID and the length of the chip ID.

If the client is not capable of grasping the purpose of a command necessary for the utilization of the IC chip and merely relays the command received from the server to the IC chip, the client will also not be capable of knowing which portion of the response data received from the IC chip corresponds to the chip ID. By virtue of the ID location information described above, however, the client is capable of extracting the chip ID from the response data with a high degree of reliability.

It is possible to provide the information processing system with a configuration in which an identifier used by the client in referring to the chip ID extracted from the response data received is further included in the ID acquisition command issued by the server. In this case, the ID extraction section associates the extracted chip ID with the identifier, which may be expressed as an array of alphanumeric characters.

According to an embodiment of the present invention, the client embeds the chip ID into the processing command (overwrites on a predetermined location) and issues the processing command including the chip ID to the IC chip directly by bypassing the server. By virtue of the identifier associated with the chip ID, it is possible to identify the correct chip ID, which is used in a process carried out at a later stage (the process to embed the chip ID into the processing command), with a high degree of reliability.

It is possible to provide the information processing system with a configuration in which embedding position information showing the embedding position of the chip ID is further included in the processing command issued by the server. In this case, the processing-command sender section embeds the chip ID into the processing command on the basis of the embedding position information.

If the client is not capable of grasping the purpose of a command necessary for the utilization of the IC chip and merely relays the command received from the server to the IC chip, the client will also not be capable of knowing which portion of the processing command to be relayed to the IC chip is used as the embedding position of the chip ID. By virtue of the embedding position information included in the processing command, however, the client is capable of embedding the chip ID into a proper position in the processing command.

It is possible to provide the information processing system with a configuration in which an identifier usable in the client as information for identifying the chip ID is further included in the processing command issued by the server. In this case, by using the identifier, the processing-command sender section identifies the chip ID, which has been associated with the identifier as described earlier, and embeds the chip ID associated with the identifier into the processing command.

As described above, according to the embodiment of the present invention, the client embeds the chip ID into the processing command and issues the processing command including the chip ID to the IC chip directly by bypassing the server. By virtue of the identifier, it is possible to identify the chip ID, which has been acquired and associated with the identifier by the client, with a high degree of reliability. It is also possible to provide the information processing system with a configuration in which the chip-ID extraction section associates the identifier with the chip ID as described before.

It is possible to provide the information processing system with a configuration in which the IC chip and the client carry out radio communications conforming to near-field radio-communication standards. In this case, the IC chip serving as a data-communication object is normally embedded in an IC tag or an IC card. Such media is exposed to the air in many cases so that it is possible to effectively carry out non-contact radio communications providing no contactor with the air. An example of such a non-contact radio communication is a radio communication conforming to NFC (Near Field Communication) standards. Since the utilization range according to the NFC standards is a near field of about 10 cm, the communication conforming to the NFC standards offers excellent security of limiting communication partners by a band action.

In order to solve the problem described above, in accordance with a further embodiment of the present invention, there is provided a client receiving support from a server connected to the client by a communication network in driving an IC chip to carry out predetermined processing. The client includes a processing-command requesting section, an ID-acquisition-command sender section, a chip-ID extraction section, and a processing-command sender section. The processing-command requesting section is configured to issue a request to the server as a request for transmission of a processing command to be executed by the IC chip to carry out the predetermined processing from the server to the client. The ID-acquisition-command sender section is configured to pass on an ID acquisition command received from the server as a command for acquiring the chip ID of the IC chip to the IC chip. The chip-ID extraction section is configured to extracting the chip ID from data given by the IC chip to the client in response to the ID acquisition command. The processing-command sender section is configured to embed the chip ID extracted from the response data in the processing command received from the server and transmit the processing command including the embedded chip ID to the IC chip. The IC chip transmits data including the chip ID in response to the ID acquisition command received from the ID-acquisition-command sender section to the client. The IC chip further produces a result of determination as to whether or not the chip ID embedded in the processing command received from the processing-command sender section is identical with the chip ID of the IC chip. The IC chip further carries out the predetermined processing in accordance with the processing command if the result of the determination indicates that the chip ID embedded in the processing command received from the processing-command sender section is identical with the chip ID of the IC chip.

The configuration described above is a configuration including a client and an IC chip integrated with the client. In this configuration, the IC chip is put in a state of being capable of making an access to the client. For example, the IC chip is put in a state of being embedded in the client as a chip for carrying out functions independently of the client. It is possible to put the client and the IC chip in a configuration wherein, while the client includes the IC chip, the client is capable of communicating with another external IC chip. In this case, the client communicates with the other external IC chip through a reader/writer also included in the configuration.

In order to solve the problem described above, in accordance with a still further embodiment of the present invention, there is provided a server connected by a communication network to a client for driving an IC chip to carry out predetermined processing. The server is includes a command-group sender section configured to send a processing command for making a request for the predetermined processing and an ID acquisition command for acquiring the chip ID of the IC chip with the same timing at a request made by the client as a request for transmission of the processing command from the server to the client.

In the past, a server acquires the unique chip ID of an IC chip in accordance with a request made by a client as a request for processing of the IC chip. The server then embeds the acquired chip ID in a processing command and transmits the processing command to the IC chip. In accordance with an embodiment of the present invention, on the other hand, a part of the processing carried by the server in the past is transferred to a client in order to reduce the magnitude of a load borne by the server. In this case, the server transmits the processing command and an ID acquisition command for acquiring the chip ID of an IC chip with the same timing to the client.

In addition, the present invention also provides programs to be executed by a computer to carry out the functions of the server and client described above. On top of that, the present invention also provides an information processing method to be adopted by the server and the client as a method for driving the IC chip to carry out predetermined processing.

The functions of the IC chip, client and server described above can also be combined in the configuration of a single apparatus. In this configuration, some of functions can be swapped among the IC chip, the client and the server or shared by the IC chip, the client and the server. In addition, each configuration element of the client can be provided in another apparatus as an element independent of the other configuration elements. On top of that, the client and the server may refer to another database in execution of an application.

As described above, in accordance with an embodiment of the present invention, in utilization of an IC chip, it is possible to reduce a processing load borne by the server and the number of accesses made by the server as accesses to the client as well as the number of accesses made by the client as accesses to the server. Thus, the time it takes to carry out each process unit can be decreased. As a result, the present invention is also suitable for an application entailing a high access frequency and an application with an access time limited to a predetermined length.

DETAILED DESCRIPTION OF THE PREFERRED EMBODIMENTS

Figure 1:
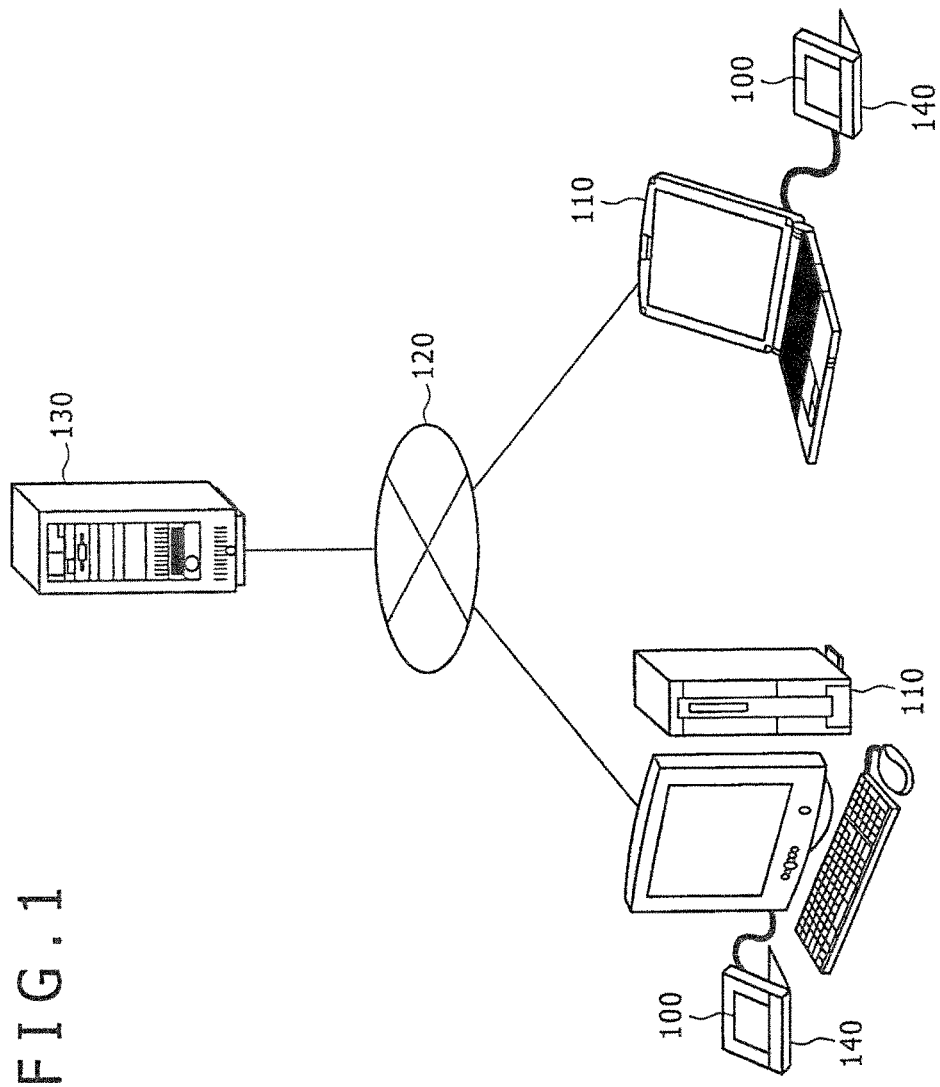
FIG. 1 is a block diagram showing a rough configuration of an information processing system according to a first embodiment.

Preferred embodiments of the present invention are described in detail by referring to drawings as follows. It is to be noted that configuration elements having essentially identical functional configurations are denoted by the same reference numeral throughout this patent specification and the drawings in the specification, and such configuration elements are not repeated in order to avoid duplications.

In order to make the description of the embodiments better understandable, as an example, reference to a balance in an electronic-money IC card is imagined. A PC (personal computer) functioning as a client makes an access to an IC card, which includes an IC chip embedded therein, by way of a server. In this case, the server acquires a balance in the electronic-money IC card and displays the balance obtained as a result of the acquisition on the screen of the PC. The PC is not allowed to acquire information directly from the IC card for a security reason. For example, only the server is capable of generating a command for acquiring a balance from the IC card. In this case, the server transmits only the balance obtained as a result of the acquisition to the PC. A concrete configuration of each of the embodiments is explained by referring to drawings as follows.

(First Embodiment: an Information Processing System)

FIG. 1 is a block diagram showing a rough configuration of an information processing system according to a first embodiment. The information processing system includes an IC chip 100 embedded in an IC card, a client 110 for requesting the IC chip 100 to carry out predetermined processing and a server 130 connected to the client 110 through a communication network 120 such as the Internet. The server 130 gives support to the IC chip 100 through the client 110 in carrying out the predetermined processing.

The client 110 and/or the server 130 can each be a PC, a workstation, a PDA (Personal Digital Assistant), mobile phone, a portable audio player, a home game machine, an information home appliance or a TV conference system. The client 110 and/or the server 130 are capable of at least communicating data with other apparatus by way of the communication network 120.

In order to carry out non-contact radio communications with the IC card including the embedded IC chip 100, the client 110 is connected to a reader/writer 140.

The server 130 has a security module for encoding and decoding data exchanged with the IC chip 100 as data relevant to the IC chip 100. The security module has a tamper-proof characteristic and manages a plurality of keys used in encryption and decryption processes.

As shown in FIG. 1, the IC chip 100 is used in a state of being embedded in an IC card. However, the way of utilizing the IC chip 100 is not limited to this embodiment. For example, the IC chip 100 may also be embedded in an IC tag, an electronic apparatus such as a mobile phone, the client 110 or another apparatus. In the configuration shown in FIG. 1, the IC card including the embedded IC chip 100 is mounted on a reader/writer 140, which is connected to the client 110. In this embodiment, the IC chip 100 carries out non-contact radio communications with the reader/writer 140.

An example of the non-contact radio communication is a radio communication conforming to NFC (Near Field Communication) standards. Since the utilization range according to the NFC standards is a near field of about 10 cm, the communication conforming to the NFC standards offers excellent security of limiting communication partners by a hand action. In addition, since non-contact radio communications of data can be carried out, a metallic terminal exposed to the air is not required. Thus, it is possible to render services exhibiting excellent maintainability and corrosion-proof characteristics without sacrificing the appearance of the IC card.

Unlike the magnetic-type cash card and the credit card, which have been used in the past, the IC chip 100 includes a memory having a large storage capacity so that a plurality of applications can be used in one IC chip 100. That is to say, a plurality of service providers can be registered in an IC card including an embedded IC chip 100 so that the user can receive a variety of services by utilizing one IC card.

Even if an attempt is made to utilize the IC chip 100 through the client 110, the client 110 is not provided with a technology of directly operating the IC chip 100. That is to say, the IC chip 100 is operated through the server 130 for maintenance and security reasons.

If all commands given to the IC chip 100 as commands relevant to services rendered by a plurality of service providers are to be generated by the client 110, an updating work to reflect a new command to be added for the services has to be carried out frequently and, in addition, a command generation application having a large size has to be sustained in such a way that there is no effect on applications offered by other service providers. Thus, from the maintenance point of view, a configuration having a client 110 used for storing the command generation application is not an effective configuration.

In addition, if the whole management of the IC chip 100 is executed by the client 110, the client 110 will be, capable of knowing data that should be handled by the service provider at the server 130. Thus, also for a security reason, the command generation application should not be provided in the client 110.

Thus, in order to refer to data stored in the IC chip 100, first of all, the user of the client 110 makes an access to the server 130 through a web browser of the client 110. Recognizing processing desired by the user, the server 130 starts a communication with the IC chip 100 through the client 110. As the processing is completed, the server 130 displays a result of the processing on the web browser of the client 110. In this way, the client 110 intervenes in the execution of the processing of the IC chip 100 by merely relaying a command transmitted from the server 130 to the IC chip 100.

Figure 2:
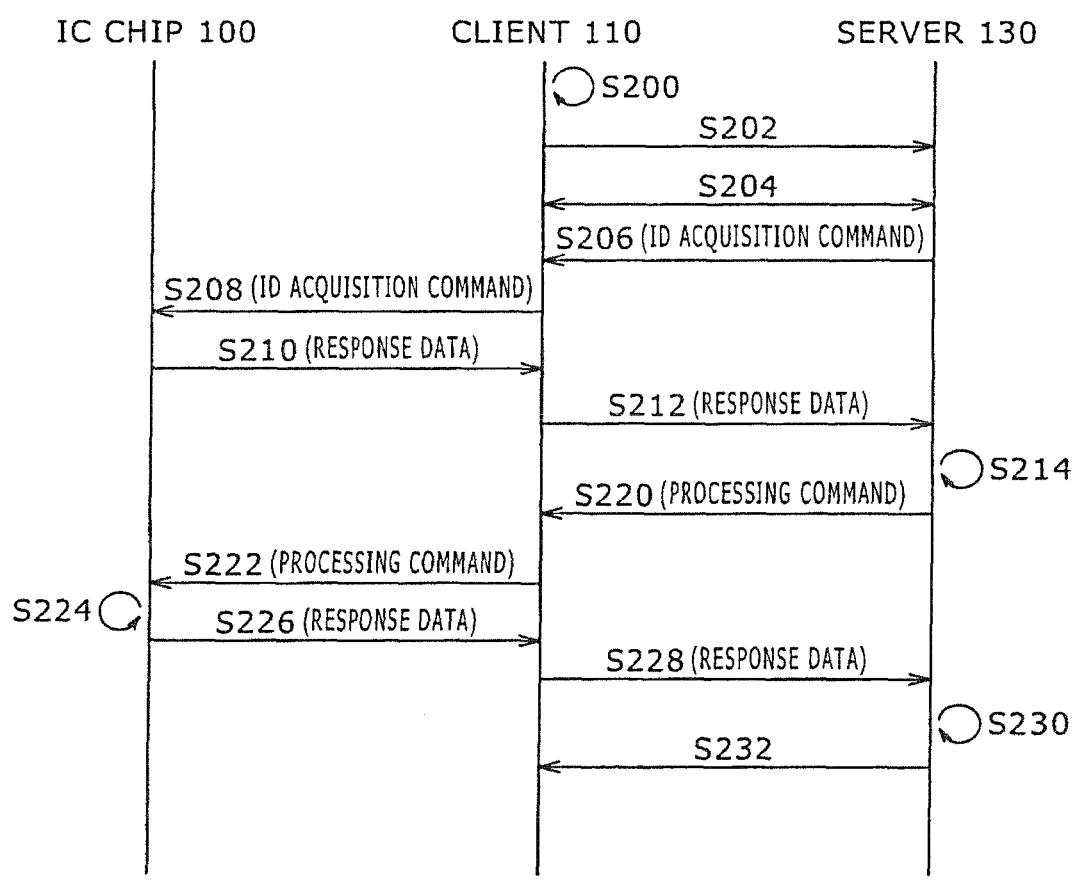
FIG. 2 shows a flowchart representing processing carried out by a client to relay a command transmitted from a server to an IC chip.

FIG. 2 shows a flowchart representing processing carried out by the client 110 to relay a command transmitted from the server 130 to the IC chip 100. As an example, the server 130 starts a communication with the IC chip 100 through the client 110 in order to carry out predetermined processing in the IC chip 100 to render a service to the server 130 as a service of providing the version of a key used to encrypt data.

The version of a key is one of a plurality of key identifiers used in communications of encrypted data between the server 130 and the IC chip 100. The key versions are used when there are a plurality of service areas in the IC chip 100 or a plurality of keys are used in one service area. The server 130 receives the version of a key from the IC chip 100 and uses the key version to encrypt of decrypt data. If no key exists in the IC chip 100, typically, a special value of FFFFh is returned to the server 130 as a key version. The special value of FFFFh notifies the server 130 that no key exists in the IC chip 100.

First of all, at a step S200 of the flowchart, the user physically connects the IC chip 100 to the client 110. The user may physically connect the IC chip 100 to the client 110 by adoption of contact connection such as a USB or RS-232 connection or by adoption of a non-contact connection conforming to the NFC standards as described above. For example, the user connects the IC chip 100 to the client 110 by adoption of a non-contact connection conforming to the NFC standards by placing or mounting an IC card including the IC chip 100 embedded therein on the reading face of the reader/writer 140. Then, at the step S202, the client 110 starts a communication with the server 130 by using either of a browser and an application, which have been provided to the client 110 by an information provider. Subsequently, at the step S204, the client 110 and the server 130 authenticate each other.

Prior to execution of predetermined processing desired by the user, the server 130 needs to acquire a chip ID assigned uniquely to the IC chip 100. For this reason, at the next step S206, the server 130 transmits an ID acquisition command for acquiring the chip ID (by typically adoption of a polling technique) to the client 110. The chip ID of the IC chip 100 is a unique number different from the IDs of the client 110 and the server 130. One chip ID can be assigned to each IC chip 100 or, as an alternative, if the service area of the IC chip 100 is divided logically into sub-areas each associated with an application, a chip ID can be assigned to each of the sub-areas. Subsequently, at the next step S208, the client 110 passes on the ID acquisition command received from the server 130 to the IC chip 100 as it is.

Then, at the step S210, the IC chip 100 transmits data including the chip ID used for identifying itself to the client 110 in response to the ID acquisition command received from the client 110. The response given by the IC chip 100 is data because normally the command issued by the server 130 is a command to read out data from a predetermined area. In the case of an ID acquisition command, the requested chip ID is included in the response data. Subsequently, at the next step S212, the client 110 passes on the response data received from the IC chip 100 to the server 130 as it is.

As described above, the chip ID is described in a portion of the response data output by the IC chip 100. Thus, at the step S214, the server 130 extracts the chip ID from the response data and embeds the extracted chip ID in a key-version acquisition command to be issued as a processing command. This is because, since the IC chip 100 is designed to give a response only to a processing command issued by the server 130 as a command including the chip ID embedded therein, it is necessary for the server 130 to obtain the chip ID at the preceding stage. By including at least the chip ID of the IC chip 100 in the processing command, the processing command becomes a valid command for the IC chip 100.

Subsequently, at the step S220, the server 130 again transmits to the client 110 a command including the chip ID embedded therein (a key-version acquisition command) serving as a request for a service. Then, at the step S222, the client 110 passes on the key-version acquisition command received from the server 130 to the IC chip 100.

Subsequently, at the step S224, the IC chip 100 produces a result of determination as to whether or not the chip ID included in the key-version acquisition command received from the client 110 is identical with the chip ID of the IC chip 100. If the result of the determination indicates that the chip ID included in the key-version acquisition command received from the client 110 is identical with the chip ID of the IC chip 100, the IC chip 100 carries out the predetermined processing corresponding to the processing command at the step S224. Since the processing command is the key-version acquisition command in this case, the IC chip 100 prepares a key version of its own, including the key version in response data.

Then, at the step S226, the IC chip 100 transmits the response data including the key version to the client 110. Subsequently, at the step S228, the client 110 passes on the response data to the server 130. Then, at the step S230, the server 130 extracts the key version from the response data and holds the key version for processing carried at a later stage. Subsequently, at the step S232, the server 130 informs the client 110 that the process to acquire the key version has been completed.

It is necessary to strictly protect information stored in the IC chip 100. In a communication with the IC chip 100, the IC chip 100 outputs data encoded by using a key identified by the key version. Thus, a desired service is started after the client 110 or the server 130 acquires the chip ID of the IC chip 100 and a key version at the start of a communication.

In a configuration where the client 110 relays a command received from the server 130 to the IC chip 100 as described above, the server 130 needs to execute at least processing at the following two stages:

(1) a stage of acquiring the unique chip ID of the IC chip (2) a stage of issuing a processing command including the acquired chip ID to drive the IC chip 100 to carry out predetermined processing. In consequence, in the case of a client 110 serving as a communication terminal such as a mobile phone, the communication overhead increases and the rising number of communications causes an extreme delay in the entire processing.

In the case of the embodiment of the present invention, on the other hand, the server 130 does not carry out all the processing of the above two stages. Instead, the client 110 performs a portion of the processing so as to reduce the number of accesses made by the server 130 and the number of accesses made by the client 110. To be more specific, the client 110 caries out the processing to include the unique chip ID of the IC chip 100 at a predetermined position in a processing command, overwriting data existing at the predetermined position.

By taking the information processing system described above as an example, the following description explains an information processing method for driving an IC chip to carry out predetermined processing.

(Second Embodiment: the Information Processing Method)

Figure 3:
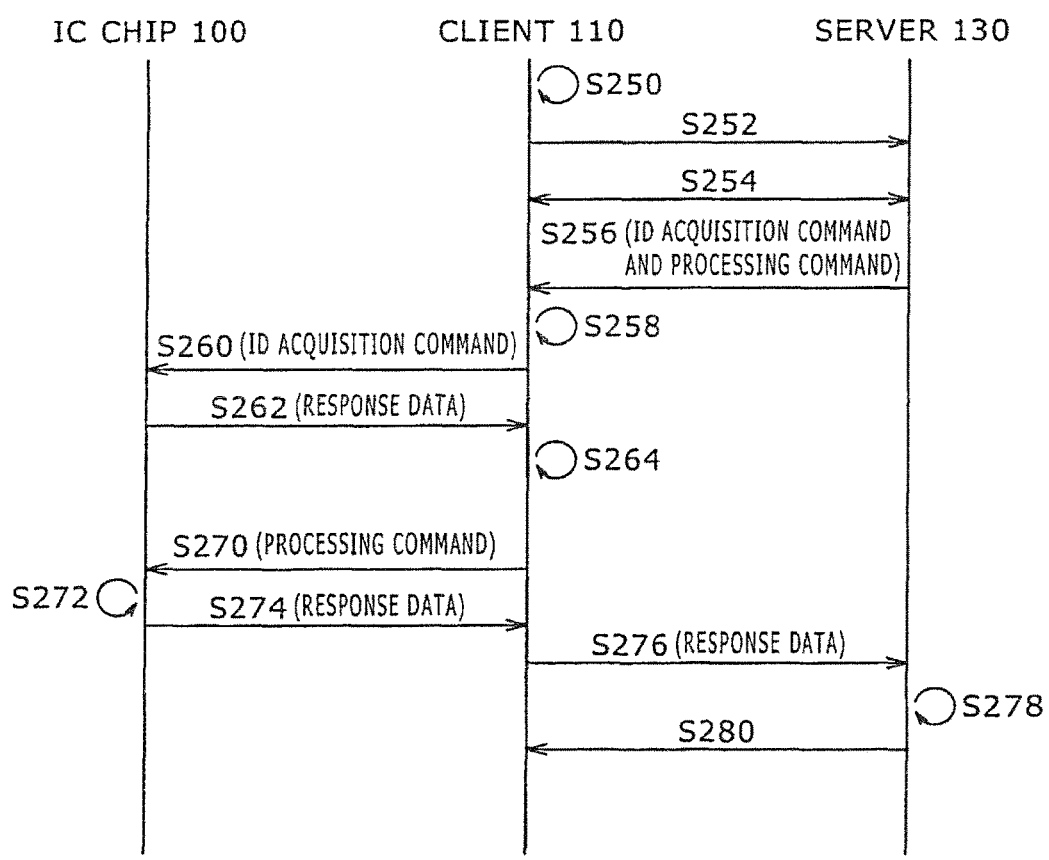
FIG. 3 shows a flowchart representing an information processing method according to a second embodiment.

FIG. 3 shows a flowchart representing the information processing method according to a second embodiment. Also in this case, as an example, the server 130 starts a communication with the IC chip 100 through the client 110 in order to carry out predetermined processing in the IC chip 100 to render a service to the server 130 through the client 110 as a service of providing the version of a key used to encrypt data.

First of all, at a step S250 of the flowchart, the user physically connects the IC chip 100 to the client 110 in the same way as the first embodiment. Then, at the step S252, the client 110 starts a communication with the server 130 by using either of a browser and an application, which have been provided to the client 110 by an information provider. If the browser is used, the user makes an HTTP (Hyper Text Transfer Protocol) request through the browser. Subsequently, at the step S254, the client 110 and the server 130 authenticate each other by a session ID or the like. At that time, the client 110 issues a request to the server 130 as a request for transmission of a processing command driving the IC chip 100 to carry out predetermined processing from the server 130 to the client 110.

At the step S256, the server 130 transmits the aforementioned processing command driving the IC chip 100 to carry out predetermined processing and an ID acquisition command for acquiring the chip ID to the client 110 with the same timing in accordance with the request received from the client 110 as a request for transmission of the processing command from the server 130 to the client 110. As described above, one chip ID can be assigned to each IC chip 100 or, as an alternative, if the service area of the IC chip 100 is divided logically into sub-areas each associated with an application, a chip ID can be assigned to each of the sub-areas.

Subsequently, at the step S258, the client 110 receiving a command group including the processing command and the ID acquisition command from the server 130 extracts the ID acquisition command from the group. Then, at the step S260, the client 110 passes on the extracted ID acquisition command to the IC chip 100 as it is.

Subsequently, at the step S262, the IC chip 100 transmits data including the chip ID used for identifying itself to the client 110 in response to the ID acquisition command received from the client 110. The response data transmitted by the IC chip 100 includes the desired chip ID at a predetermined position. Subsequently, at the step S264, the client 110 extracts the chip ID from the response data received from the IC chip 100 and saves the chip ID.

Then, at the step S270, the client 110 embeds the extracted chip ID into a predetermined position in the processing command received from the server 130 and transmits the processing command to the IC chip 100. By letting the client 110 embed the chip ID into the processing command, the number of communications carried out between the client 110 and the server 130 can be reduced.

Subsequently, at the step S272, the IC chip 100 produces a result of determination as to whether or not the chip ID included in the processing command received from the client 110 is identical with the chip ID of the IC chip 100. If the result of the determination indicates that the chip ID included in the processing command received from the client 110 is identical with the chip ID of the IC chip 100, the IC chip 100 carries out the predetermined processing corresponding to the processing command at the step S272. Since the processing command is the key-version acquisition command in this case, the IC chip 100 prepares a key version of its own, including the key version in response data.

Then, at the step S274, the IC chip 100 transmits the response data including the key version to the client 110. Subsequently, at the next step S276, the client 110 passes on the response data to the server 130 without modifying the response data. At that time, if the IC chip 100 has a plurality of key versions, all the key versions may be included in the transmitted response data. If the IC chip 100 has no key versions at all, on the other hand, a dummy value such as the value FFFFh may be included in the transmitted response data to indicate that the IC chip 100 has no key versions at all. Then, at the step S278, the server 130 extracts the key version from the response data and holds the key version for processing carried at a later stage. Subsequently, at the step S280, the server 130 informs the client 110 that the process to acquire the key version has been completed. Receiving the notice indicating that the initial process to acquire the key version has been completed, the client 110 starts the desired service.

In comparison with a communication between the IC chip 100 and the client 110, normally, it takes long time to carry out a communication between the server 130 and the client 110. Since the client 110 executes the stage of driving the IC chip 100 to carry out predetermined processing in accordance with a processing command including an acquired chip ID instead of executing the stage in the server 130 as described above, the number of time-consuming communications between the server 130 and the client 110 can be reduced. Thus, the magnitude of the communication overhead can be decreased. As a result, the delay of the entire processing can be shortened.

In consequence, the information processing method described above entails an additional special process of driving the client 110 to extract a chip ID from response data and embedding the extracted chip ID into a predetermined position in a processing command. In order to carry out the additional special process with a high degree of efficiency, the embodiment provides a special packet to be used in communications between the server 130 and the client 110. The special packet will be described later as the format of the ID acquisition command and the processing command.

The following description explains details of the configurations of the client 110, the server 130 and the IC chip 100 composing an information processing system capable of implementing the information processing method described above.

(Third Embodiment: the Client 110)

Figure 4:
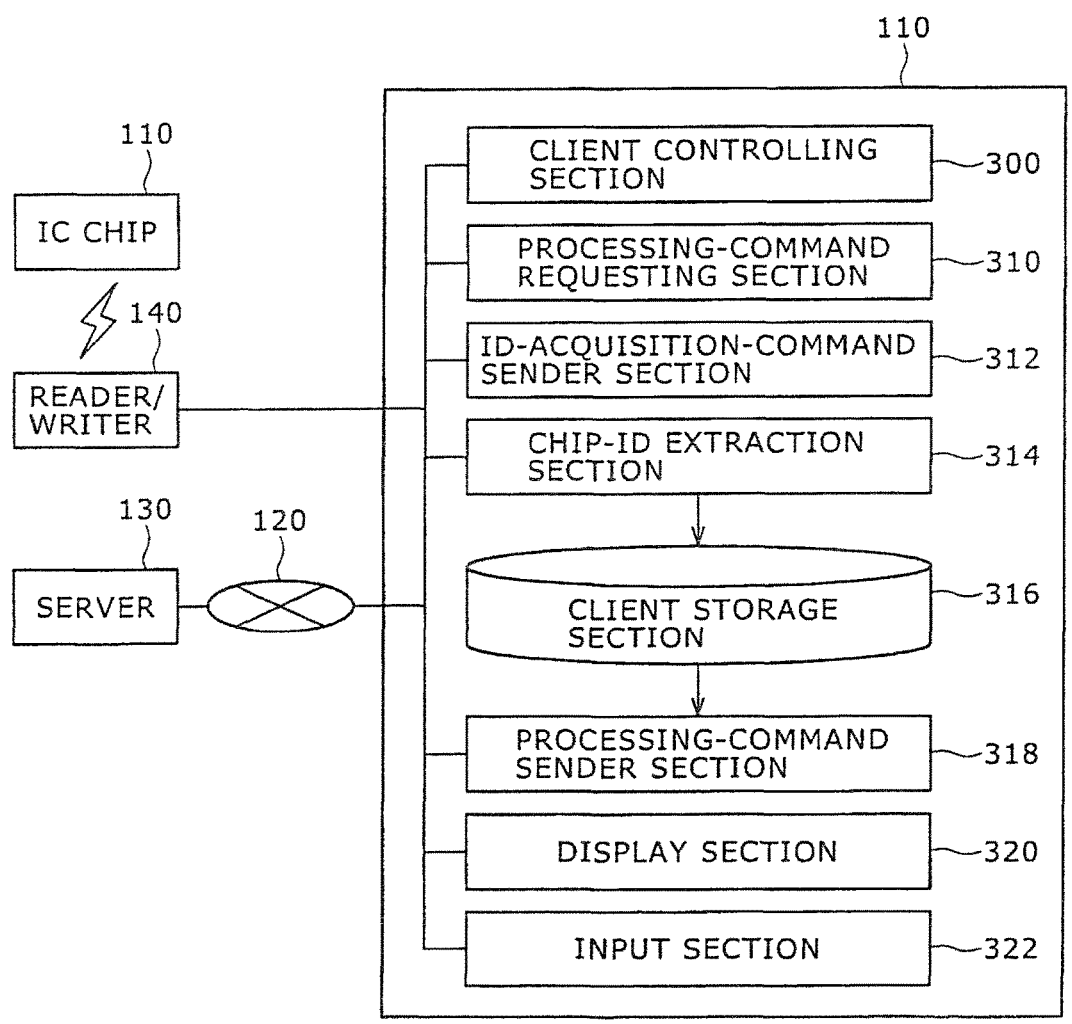
FIG. 4 is a block diagram showing a rough configuration of a client according to a third embodiment.

FIG. 4 is a block diagram showing a rough configuration of a client 110 according to a third embodiment. As shown in the figure, the client 110 includes a client controlling section 300, a processing-command requesting section 310, an ID-acquisition-command sender section 312, a chip-ID extraction section 314, a client storage section 316, a processing-command sender section 318, a display section 320 and an input section 322. By receiving support from the server 130, the client 110 drives the IC chip 100 through the reader/writer 140 connected to the client 110 to carry out predetermined processing.

The reader/writer 140 includes an antenna, an RF circuit, a modulation/demodulation circuit, an encoder and a decoder. At least, the reader/writer 140 carries out communications with the IC chip 100 in a communication domain defined by the NFC standards described earlier. The antenna, for example, may be formed as a loop antenna.

The client controlling section 300 is a semiconductor IC (integrated circuit) including a CPU (central processing unit). The client controlling section 300 is a section for managing and controlling all the other components employed in the client 110.

The processing-command requesting section 310 is a section for transmitting a request to the server 130 as a request for transmission of a processing command from the server 130 to the client 110 as a command for driving the IC chip 100 to carry out predetermined processing.

The ID-acquisition-command sender section 312 is a section for transmitting an ID acquisition command received from the server 130 as a group including the ID acquisition command and a processing command to the IC chip 100. The chip-ID extraction section 314 is a section for receiving data transmitted by the IC chip 100 in response to the ID acquisition command and extracting a chip ID from the response data.

It is possible to provide a configuration in which the ID acquisition command received from the server 130 includes ID location information showing the location of the chip ID in the response data to be received from the IC chip 100. In such a configuration, the chip-ID extraction section 314 extracts the chip ID from the response data on the basis of the ID location information.

Figure 5:
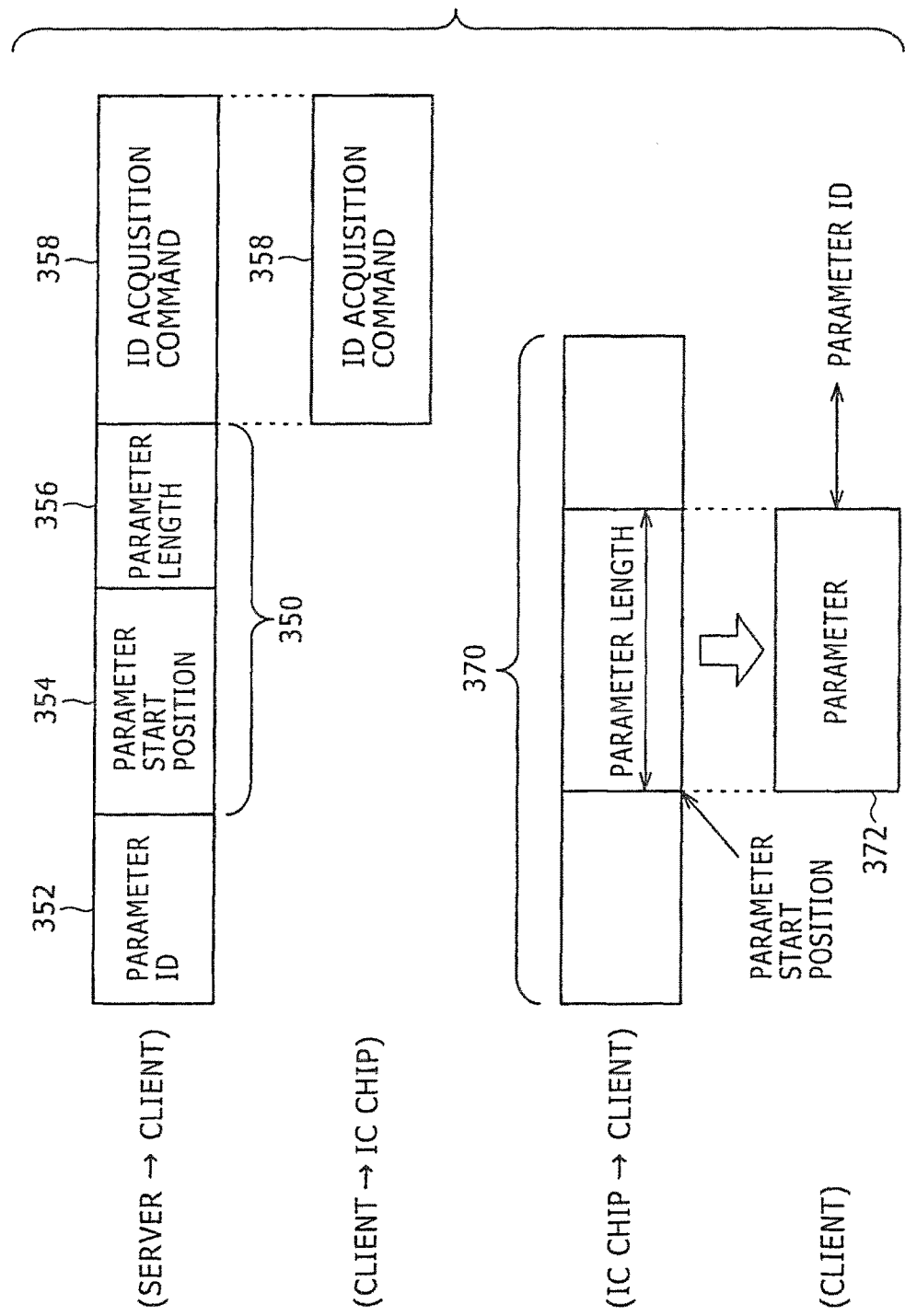
FIG. 5 is an explanatory diagram referred to in describing a model of processing carried out by the client to process an ID acquisition command.

FIG. 5 is an explanatory diagram referred to in describing a model of processing carried out by the client 110 to process the ID acquisition command. FIG. 5 shows the conceptual format of the ID acquisition command. Referring to FIG. 5, the concept of acquisition of the parameter 372 is the broader generalization of the chip ID acquisition, or the chip ID is one of parameters 372 that can be acquired from the IC chip 100 by using the ID acquisition command. In other words, the ID acquisition command can be used for acquiring any of a variety of parameters from the IC chip 100. In the following description, an ID acquisition command is explained as a command for acquisition of a parameter 372 in place of acquisition of a chip ID.

To begin with, an ID acquisition command transmitted by the server 130 to the client 110 includes parameter location information 350 serving as information on the location of a parameter 372 (chip ID), a parameter ID (identifier) 352 used for identifying the parameter 372 (chip ID).

The parameter location information 350 includes a parameter start position (chip-ID start position) 354 and a parameter length (chip-ID length) 356. Thus, the location of the parameter 372 is expressed in terms of the start position and the length of the parameter 372. However, the location of the parameter 372 can also be expressed in terms of the start and end positions of the parameter 372. The parameter ID 352 is for identifying one of a plurality of parameters in case the client 110 handles more than one parameter. If the client 110 handles only one parameter, the field of the parameter ID 352 is a reserved field or can be omitted from the ID acquisition command.

The client 110 extracts only the ID acquisition command portion 358 cited earlier from the ID acquisition command received from the server 130, and passes on the extracted ID acquisition command portion 358 to the IC chip 100. At that time, the client 110 saves the parameter ID 352, the parameter start position 354 and the parameter length 356.

Response data 370 transmitted by the IC chip 100 in response to the ID acquisition command 358 includes the acquired parameter (chip ID) 372. The client 110 extracts the parameter 372 from the response data 370. The location of the parameter 372 to be extracted from the response data 370 is determined by the parameter location information 350 including the parameter start position 354 and the parameter length 356, which have been saved earlier in the client 110. By using the parameter location information 350 in this way, the client 110 is capable of extracting the parameter (chip ID) 372 with a high degree or reliability.

Since the extracted parameter 372 will be used in another command later, the parameter 372 is associated with the parameter ID 352 extracted from the ID acquisition command and saved earlier so that the parameter 372 can be distinguished from other parameters. Associated with the parameter ID 352, the parameter 372 is stored in a client storage section 316 to be described later. The parameter 372 stored in the client storage section 316 can thus be referred to by using the parameter ID 352.

Let us refer back to the configuration shown in FIG. 4. The client storage section 316 is a recording medium such as an HDD or a memory. In particular, the parameter 372 stored in client storage section 316 is the chip ID 372 associated with the parameter ID 352, which is the identifier of the chip ID 372.

The processing-command sender section 318 is a section for embedding the chip ID extracted by the chip-ID extraction section 314 as described above into the processing command received from the server 130 and transmitting the processing command including the chip ID to the IC chip 100.

It is possible to provide a configuration in which the processing command transmitted by the server 130 includes embedding position information showing a position to which the chip ID is to be embedded in the processing command. In this case, the processing-command sender section 318 embeds the chip ID into the processing command on the basis of the embedding position information.

Figure 6:
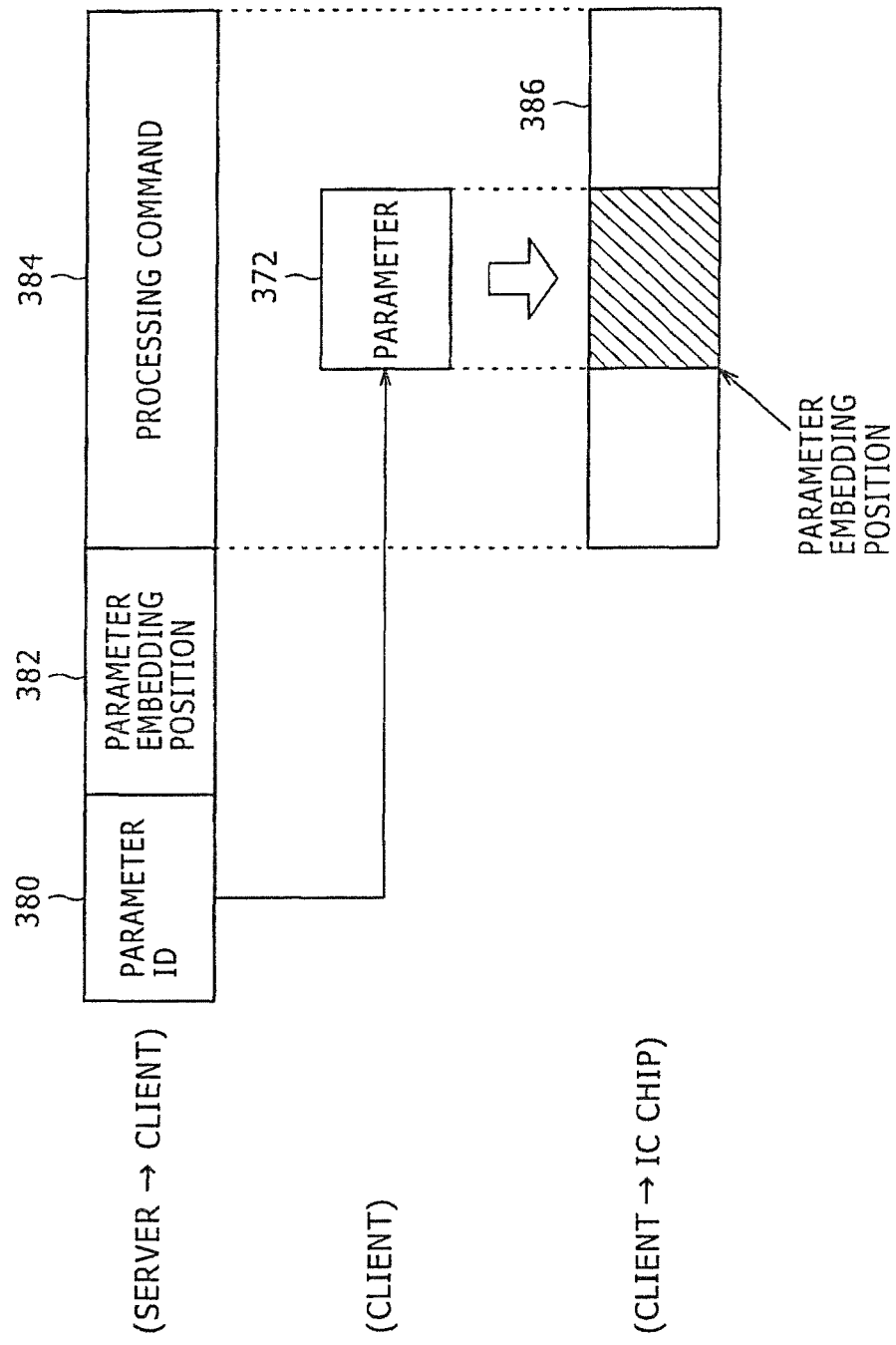
FIG. 6 is an explanatory diagram referred to in describing a model of processing carried out by the client to process a processing command.

FIG. 6 is an explanatory diagram referred to in describing a model of processing carried out by the client 110 to process the processing command. FIG. 6 shows the conceptual format of the processing command. Much like FIG. 5, in the model shown in FIG. 6, a parameter 372 is used as a quantity generalizing the chip ID in a concept broader than the chip ID.

To begin with, a processing command transmitted by the server 130 to the client 110 includes a parameter ID 380 used for identifying a parameter (chip ID) 372 to be embedded in the processing command, embedding position information 382 (embedding position information) serving as information on a position into which the parameter 372 is to be embedded in the processing command and a processing command portion 384.

Much like the parameter ID 352, the parameter ID 380 is for identifying one of a plurality of parameters in case the client 110 handles more than one parameter. If the client 110 handles only one parameter, the field of the parameter ID 380 is a reserved field or can be omitted from the processing command. As an alternative, it is also possible to provide a configuration in which the parameter ID 380 is omitted from the processing command. In the case of this configuration, the parameter 372 is read out from a predetermined storage location.

When the server 130 generates the processing command to be transmitted to the client 110, the processing command portion 384 does not include the parameter (chip ID) 372 since the parameter is not known by the server 130. Thus, the field included in the processing command portion 384 as a field to be occupied later by the parameter 372 can be filled up with a dummy value such as an array of zero or Fh bytes.

The client 110 reads out a parameter (chip ID) identified by the parameter ID 380 from the client storage section 316. Since the parameter ID 380 of the processing command is identical with the parameter ID 352 of the ID acquisition command, in actuality, the client 110 reads out the parameter 372 acquired earlier by the ID acquisition command from the parameter ID 380.

The client 110 then embeds the parameter (chip ID) 372 at a position indicated by the parameter embedding position 382 in the processing command 384 in order to generate a processing command 386 to be transmitted to the IC chip 100. Subsequently, the IC chip 100 carries out the predetermined processing on the basis of the chip ID 372 included in the processing command 386. By virtue of the parameter embedding position 382 indicating a position into which the chip ID 372 is to be embedded in the processing command, the client 110 is capable of embedding the chip ID 372 into the processing command 386 at a proper position. In addition, by using the parameter ID 380 as the identifier, the client 110 is capable of reliably identifying the parameter (chip ID) 372 already acquired in the client 110.

As described above, the client 110 extracts a chip ID and embeds the extracted chip ID into a processing command at a proper position. In addition, the client 110 does not have to verify that the extracted data is a chip ID and know how a plurality of commands will work.

That is to say, the client 110 merely reads out data from the IC chip 100 or writes data into the IC chip 100 in accordance with a command received as a packet from the server 130 as described above. The server 130 executes management of actual commands. Thus, the client 110 needs to have only a capability of interpreting common and simple commands received from the server 130. It is not necessary for the client 110 to interpret and hold a command requiring a high processing performance to process a large amount of data. In such a configuration, it is no longer necessary to update applications in the client 110 every time a new service or a new command is added to the information processing system. Thus, a good maintenance capability can be sustained at a low cost.

It is also possible to provide a configuration in which the ID acquisition command and processing command transmitted by the server 130 each include a minimum identifier usable by the client 110 for recognizing a command. (For example, the identifier included in a command can be used by the client 110 to determine whether the command is a read or write command.)

The display section 320 is a black/white or color display unit. The display section 320 displays a service rendered by the IC chip 100 by using the GUI of a web browser provided by the server 130 or an application. The input section 322 is an input unit such as a keyboard or ten-key board not shown in the figure. The input section 322 provides support to the display section 320 and is operated to select a service.

A program can be provided as a program to be executed by a computer to implement the functions of the client 110. In this case, a recording medium used for storing the program can be provided.

(Embodiment Implementing the Actual Circuit of the Client 110)

Figure 7:
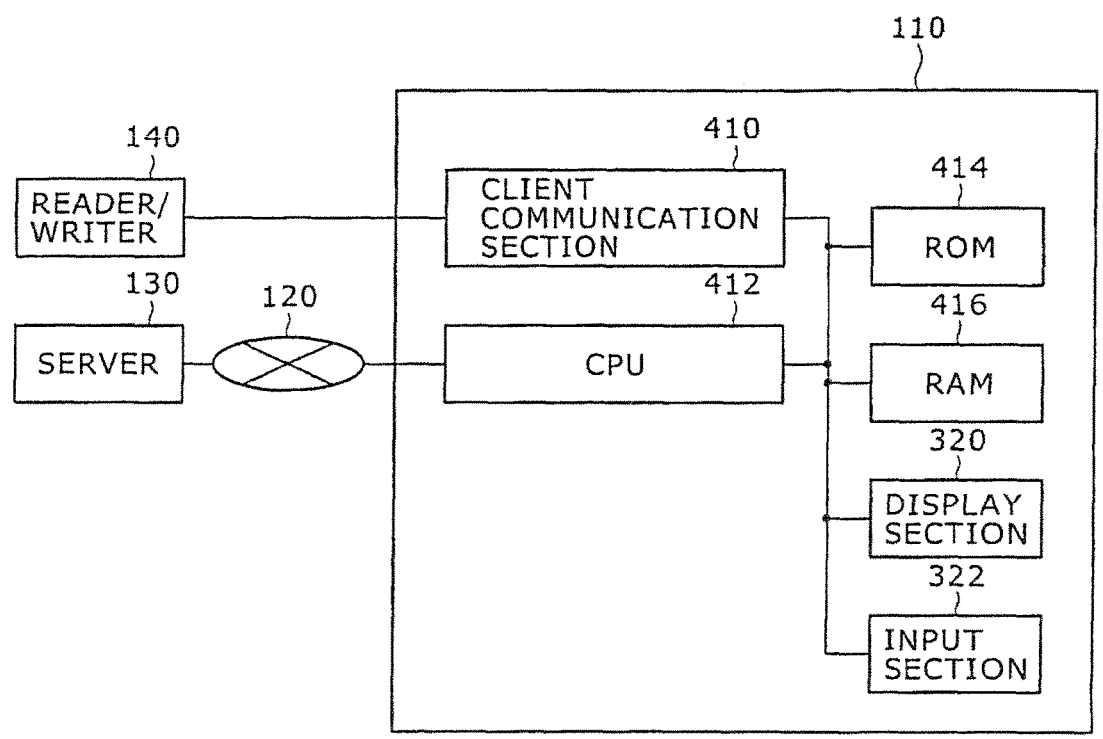
FIG. 7 is a circuit block diagram showing a rough configuration of the client according to the third embodiment.

FIG. 7 is a circuit block diagram showing a rough configuration of the client 110 according to the third embodiment. The figure shows a more concrete circuit of the client 110.

As shown in the figure, the client 110 includes a client communication section 410, a CPU 412, a ROM 414, a RAM 416, the display section 320 described above and the input section 322 also explained earlier.

The client communication section 410 is connected to the reader/writer 140 as a section for carrying out data communications with the IC chip 100. It is possible to provide a configuration in which the client communication section 410 incorporates the reader/writer 140. The configuration elements of the reader/writer 140 are an antenna, an RF circuit, a modulation/demodulation circuit, an encoder and a decoder. The antenna can be a loop antenna. The modulation/demodulation circuit is a circuit for modulating data, which is to be transmitted to the IC chip 100, by adoption of a technique conforming to the NFC standards and demodulating a modulated wave received from the IC chip 100.

The CPU 412 is a semiconductor integrated circuit for processing signals and executing management/control of all the other sections employed in the client 110. Connected to the CPU 412 by a bus, the ROM 414 is a memory used for storing programs in advance as programs to be read out and executed by the CPU 412 to control all the other sections employed in the client 110. The RAM 416 is a memory used for temporarily storing predetermined data having the CPU 412 execute functions of the client 110 and for temporarily storing variables. Thus, the RAM 414 can also be used as the client storage section 316 described before.

Since the display section 320 and the input section 322 have already been described earlier, their detailed descriptions are not repeated.

(Fourth Embodiment: the Server 130)

Figure 8:
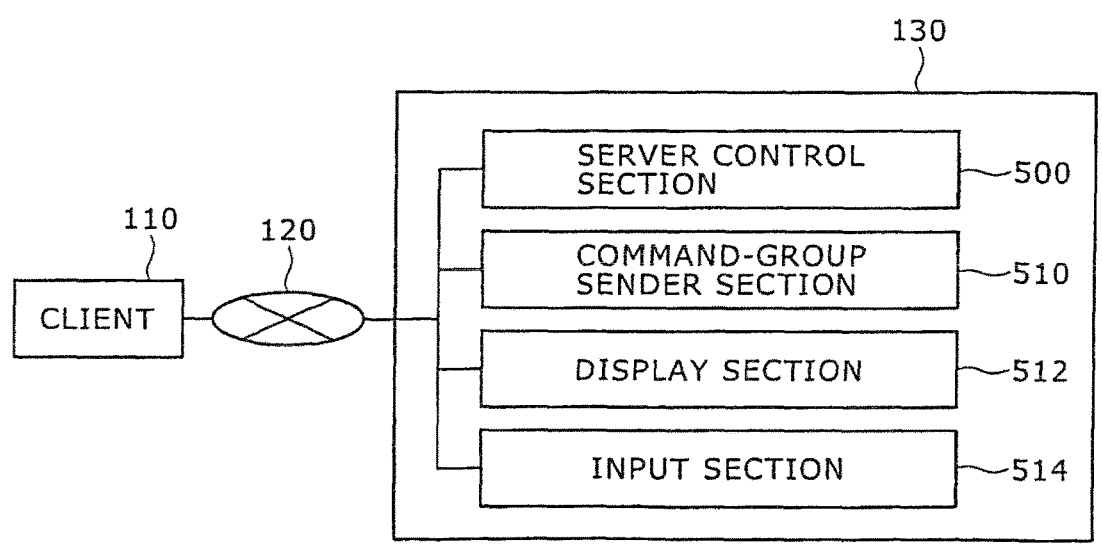
FIG. 8 is a block diagram showing a rough configuration of a server according to a fourth embodiment.

FIG. 8 is a block diagram showing a rough configuration of the server 130 according to a fourth embodiment. As shown in the figure, the server 130 includes a server control section 500, a command-group sender section 510, a display section 512, and an input section 514. The server 130 provides the IC chip 100 with support of predetermined processing by way of the client 110, which drives the IC chip 100 to carry out the predetermined processing.

The server control section 500 is a semiconductor integrated circuit including a Central Processing Unit (CPU) for executing control/management of all the other components employed in the server 130.

The command-group sender section 510 is a unit for transmitting a processing command and an ID acquisition command to the client 110 with the same timing in accordance with a request made by the client 110 as a request for transmission of the processing command from the server 130 to the client 110. As described before, the processing command is a command for driving the IC chip 100 to carry out predetermined processing. On the other hand, the ID acquisition command is a command for acquiring the chip ID of the IC chip 100.

The display section 512 is a black/white or color display unit for displaying information on addition of a command in the server 130, information on a browser provided to the client 110 and information on processing to change a content. The input section 514 is an input unit such as a keyboard or ten-key board not shown in the figure. The input section 514 provides the display section 512 with support of display functions.

In response to a request received from the client 110 as a request for processing to be carried out by the IC chip 100, in the information processing system in the past, the server 130 acquires the unique chip ID of the IC chip, embeds the acquired chip ID into a processing command and transmits the processing command including the chip ID to the client 110. In the case of the embodiment, on the other hand, a portion of the processing carried out by the server 130 is transferred to the client 110 in order to reduce the load borne by the server 130. In this case, the server 130 transmits a processing command and an ID acquisition command to the client 110 with the same timing.

A program can be provided as a program to be executed by a computer to implement the functions of the server 130. In this case, a recording medium used for storing the program can be provided.

(Embodiment Implementing the Actual Circuit of the Server 130)

The server 130 according to the fourth embodiment has almost the same circuit blocks as the client 110 according to the third embodiment. That is to say, the configuration of the server 130 includes at least a CPU, a ROM, a RAM, a display section and an input section. Thus, since the configuration elements have functions essentially identical with the configuration elements of the third embodiment described earlier, the configuration elements of the fourth embodiment are not explained in order to avoid duplications.

(Fifth Embodiment: the IC Chip 100)

Figure 9:
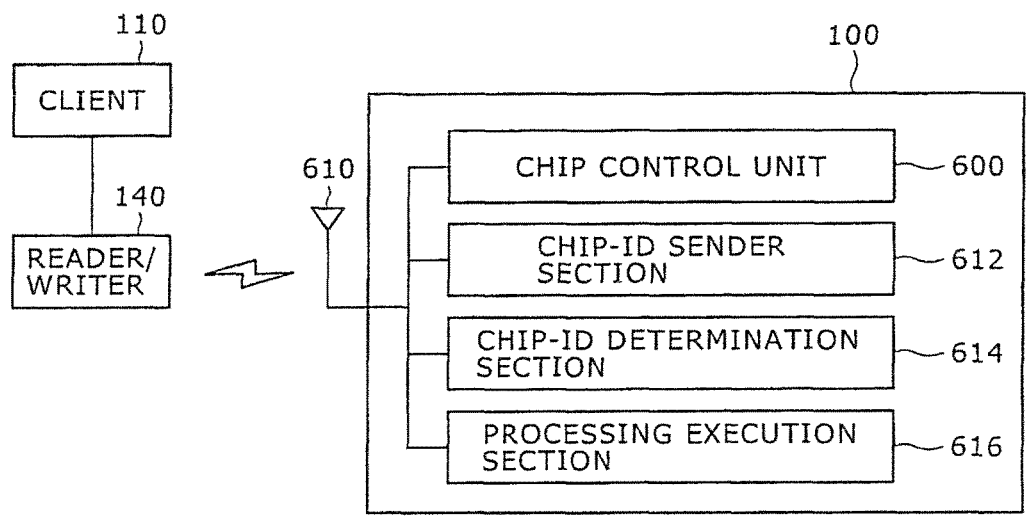
FIG. 9 is a block diagram showing a rough configuration of an IC chip according to a fifth embodiment.

FIG. 9 is a block diagram showing a rough configuration of an IC chip 100 according to a fifth embodiment. As shown in the figure, the IC chip 100 includes a chip control unit 600, an antenna 610, a chip-ID sender section 612, a chip-ID determination section 614 and a processing execution section 616.

The chip control unit 600 is a semiconductor integrated circuit including a Central Processing Unit (CPU) executing control/management of all the other components employed in the IC chip 100.

The antenna 610 is typically a loop antenna having a communication band for carrying out radio communications according to the NFC standards.

The chip-ID sender section 612 is a unit for transmitting data including the chip ID of the IC chip 100 to the client 110 in response to an ID acquisition command received from the client 110 under condition that the client 110 is in a range of being capable of communicating with the IC chip 100, such as the radio communication system typically conforms to the NFC standards, and the client 110 is located within a distance of about 10 cm from the IC chip 100. The fact that the client 110 is in a range of being capable of communicating with the IC chip 100 is automatically detected. Then, after the IC chip 100 and the client 110 authenticates each other, a communication between the IC chip 100 and the client 110 is started automatically.

The chip-ID determination section 614 is a unit for extracting a chip ID from a processing command received from the client 110 and producing a result of determination as to whether or not the extracted chip ID matches the chip ID of the IC chip 100.

The processing execution section 616 is a unit for carrying out predetermined processing according to a processing command received from the client 110 if a determination result produced by the chip-ID determination section 614 indicates that a chip ID extracted from the processing command matches the chip ID of the IC chip 100. Normally, the predetermined processing is processing to output data held in the IC chip 100 but is not limited to the processing to output such data. For example, the predetermined processing can be any one of various kinds of processing such as processing to set a flag or switch in the IC chip 100 and processing to turn on/off an LED or the like. In addition, the output data held in the IC chip 100 is not limited to a parameter such as a user ID or an amount of money, but the data can also be URL or rough information on a special thing or a place, detailed information, map information, a fee or a time and date.

A program can be provided as a program to be executed by a computer to implement the functions of the IC chip 100. In this case, a recording medium used for storing the program can be provided.

(Embodiment Implementing the Actual Circuit of the IC Chip 100)

Figure 10:
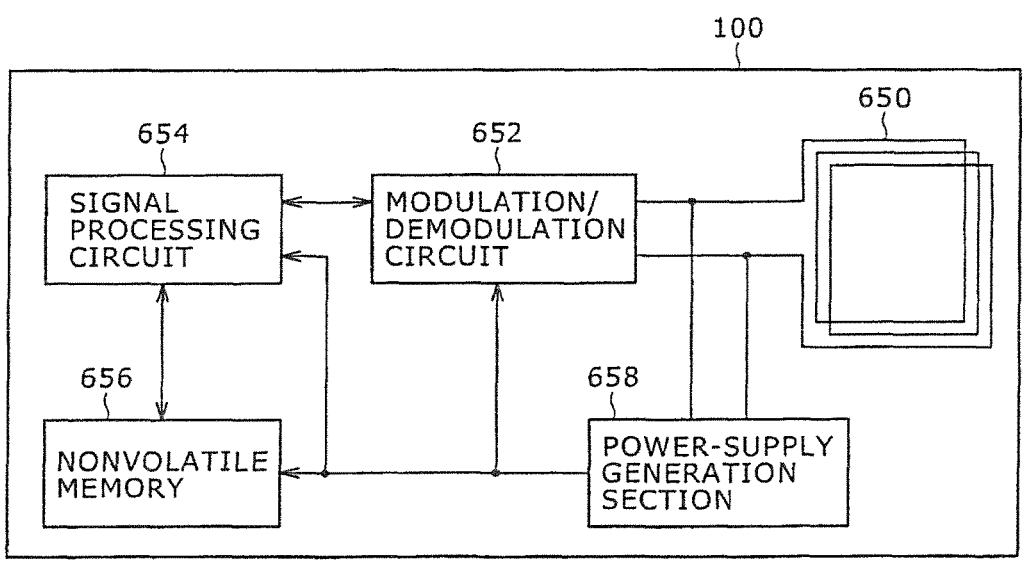
FIG. 10 is a circuit block diagram showing a rough configuration of an IC chip according to the fourth embodiment.

FIG. 10 is a circuit block diagram showing a rough configuration of an IC chip 100 according to the fourth embodiment. The figure shows a more concrete circuit of the IC chip 100.

As shown in the figure, the IC chip 100 includes a loop antenna 650, a modulation/demodulation circuit 652, a signal processing circuit 654, a nonvolatile memory 656 and a power-supply generation section 658.

The loop antenna 650 is formed to include a plurality of loops for increasing the reception sensitivity of the IC chip 100 even in a small space. In this way, the IC chip 100 is made capable of carrying out radio communications with the client 110 in conformity with the NFC standards. In addition, in dependence on the adopted communication standards and the frequency of the carrier wave, it is possible to carry out radio communications with the client 110 by using an antenna embedded in the IC chip 100 in place of the loop antenna 650.

The modulation/demodulation circuit 652 is a unit for modulating data to be transmitted to the client 110 in a modulation process conforming to the NFC standards and demodulating a modulated wave received from the client 110 into original data conveyed by the wave.

The signal processing circuit 654 is a semiconductor integrated circuit for processing signals and executing management/control of all the other sections employed in the IC chip 100. The nonvolatile memory 656 is a memory having functions of both a RAM and a ROM. That is to say, even if the power supply is turned off, the nonvolatile memory 656 does not lose data stored therein. Thus, a person in charge of management of the IC chip 100 may rewrite data stored in the nonvolatile memory 656 and, even if the power supply is turned off thereafter, the data remains in the nonvolatile memory 656.

The power-supply generation section 658 is a unit for converting an electric wave received from the client 110 into a power while a radio communication with the client 110 is being carried out and supplying the power to the modulation/demodulation circuit 652, the signal processing circuit 654 and the nonvolatile memory 656. Since the power supplied by the power-supply generation section 658 to the modulation/demodulation circuit 652, the signal processing circuit 654 and the nonvolatile memory 656 is originally obtained from an electric wave with limited power, the modulation/demodulation circuit 652, the signal processing circuit 654 and the nonvolatile memory 656 are each designed from devices each having small power consumption.

(Sixth Embodiment: Another Embodiment Implementing the Client)

Figure 11:
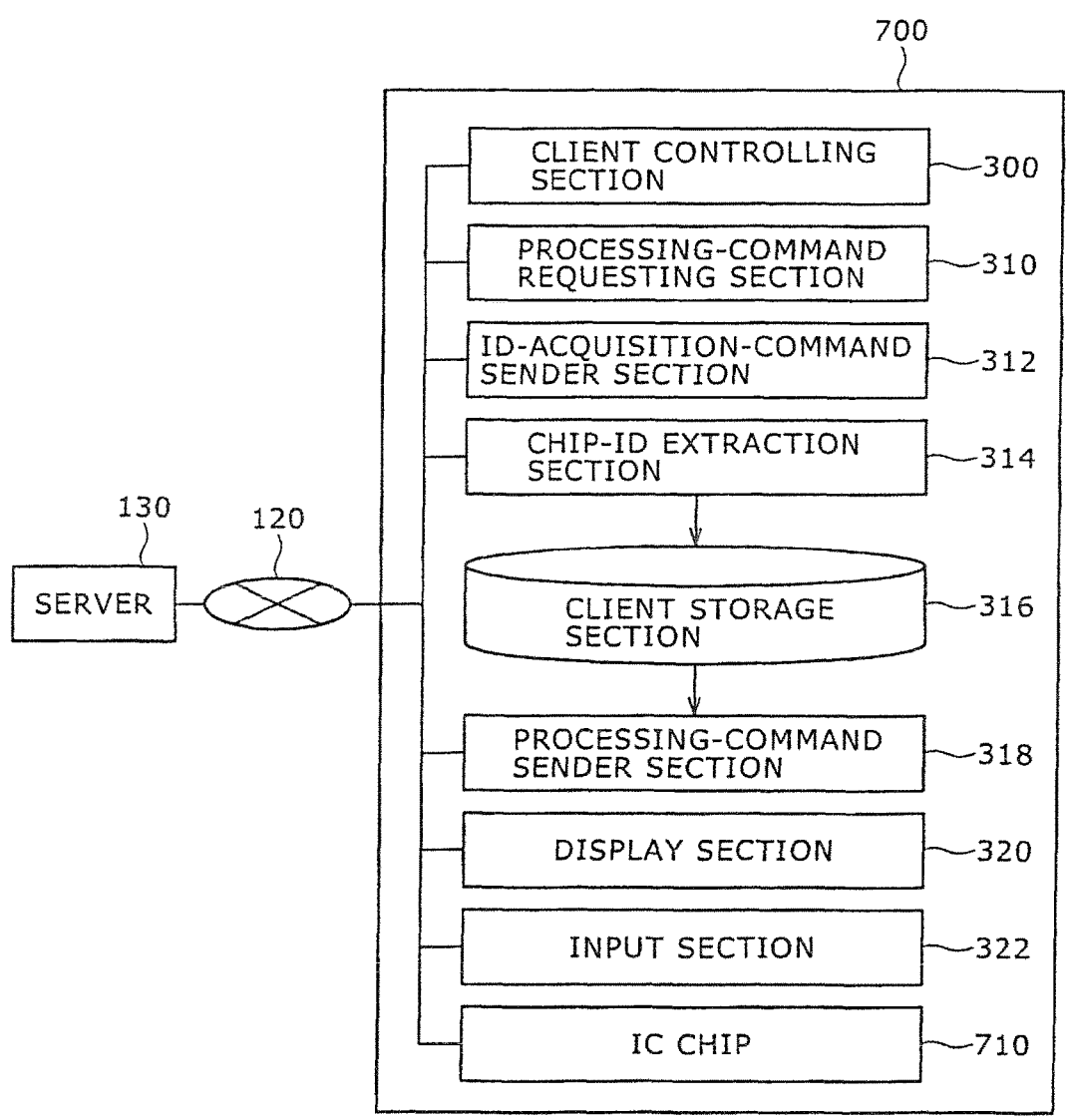
FIG. 11 is a circuit block diagram showing a rough configuration of a client according to a sixth embodiment.

FIG. 11 is a circuit block diagram showing a rough configuration of a client 700 according to a sixth embodiment. As shown in the figure, the client 700 includes a client controlling section 300, a processing-command requesting section 310, an ID-acquisition-command sender section 312, a chip-ID extraction section 314, a client storage section 316, a processing-command sender section 318, a display section 320, an input section 322 and an IC chip 710.

The configuration of the client 700 is a configuration obtained by combining the client 110 according to the third embodiment with the IC chip 100 according to the fifth embodiment. Even though the IC chip 710 is embedded in the client 700, the IC chip 710 carries out its functions independently of the client 700. Thus, configuration elements essentially identical with the configuration elements of the third and fifth embodiments described earlier are not explained again in order to avoid duplications. That is to say, the following description explains only differences between the fifth embodiment and the third and fifth embodiments.

As described above, the IC chip 710 is embedded in the client 700. Thus, the main elements of the client 700 no longer needs, for example, the client control section 300 for carrying out radio communications for exchanging data with the IC chip 710. That is to say, the main elements of the client 700 are connected to the IC chip 710 by a bus or the like for carrying out wire communications with the IC chip 710. Thus, the reader/writer 140 is also not necessarily used either.

The client 700 can be presumably a communication terminal such as a PDA or a mobile phone. The communication terminal is capable of making an access to the server 130 in order to receive a service rendered by the IC chip 710.

(Seventh Embodiment: Another Embodiment Implementing the Client)

Figure 12:
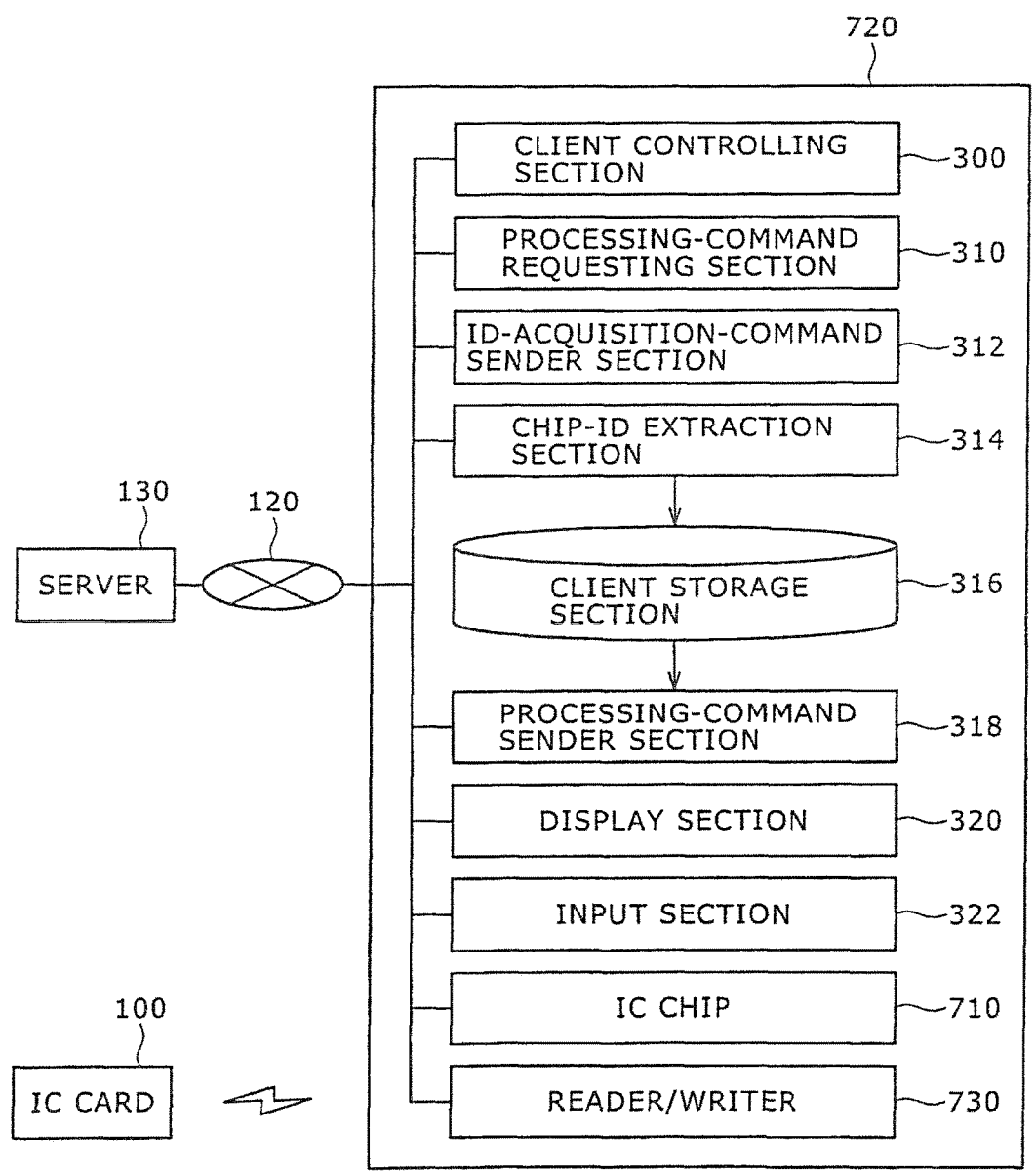
FIG. 12 is a circuit block diagram showing a rough configuration of a client according to a seventh embodiment.

FIG. 12 is a circuit block diagram showing a rough configuration of a client 720 according to a seventh embodiment. As shown in the figure, the client 720 includes a client controlling section 300, a processing-command requesting section 310, a ID-acquisition-command sender section 312, a chip-ID extraction section 314, client storage section 316, a processing-command sender section 318, a display section 320, an input section 322, an IC chip 710 and a reader/writer 730.

The configuration of the client 720 is a configuration obtained by adding the reader/writer 730 for communicating with an external IC chip 100 provided separately from the client 720 to the client 700 according to the sixth embodiment explained above. Thus, much like the sixth embodiment, configuration elements essentially identical with the configuration elements of the third and fifth embodiments described earlier are not explained again in order to avoid duplications. That is to say, effects exhibited as a result of embedding the reader/writer 730 are explained.

At the present time, researchers conduct studies to provide a communication terminal such as a mobile phone with reader/writer functions, which are capable of communicating with an external IC chip 100 provided separately from the communication terminal, in addition to the secure IC chip 710. By providing the configuration with functions of both the IC chip 710 and the reader/writer 730, it is possible to not only utilize the functions of the IC chip 710 by using the familiar communication terminal, but also easily make an access to an external IC chip 100 provided separately from the communication terminal even in an environment not including a nearby reader of the IC chip 100. As a result, the degree of freedom to use the communication terminal is raised to help promote sales of IC cards and communication terminals.

It is possible to provide a configuration in which the reader/writer 730 is integrated with the IC chip 710 to form a single unit.

Programs can each be provided as a program to be executed by a computer to implement the functions of the client 700 and the client 720 respectively. In this case, a recording medium used for storing each of the programs can be provided.

The preferred embodiments of the present invention have been described by referring to diagrams so far. It is needless to say, however, that the scope of the present invention is not limited to the preferred embodiments. It is obvious that a person skilled in the art is capable of coming up with a variety of changes and modifications within domains described in the scope of claims appended to this specification. Such changes and modifications are of course to be interpreted as changes and modifications falling within the technological range of the present invention. That is to say, it should be understood by those skilled in the art that a variety of modifications, combinations, sub-combinations and alterations may occur in dependence on design requirements and other factors insofar as they are within the scope of the appended claims or the equivalents thereof.

For example, in the embodiments described above, an IC acquisition command and a processing command are transmitted from the server to the client with the same timing as a pair of commands. However, commands transmitted from the server to the client are not limited to this pair of commands. For example, if the IC chip is not secure, a pair of read and write commands is used. In this case, a portion of data read out by the read command is extracted and embedded into the write command as it is. Then, the write command is issued to the IC chip. In this way, it is possible to use a variety of commands that can be used for reducing the amount of communication traffic between the client and the server.

In addition, in the embodiments described above, communications between the IC chip and the client are radio communications carried out by adoption of the non-contact technique. However, the configuration of the information processing system is not limited to this scheme. That is to say, communications between the IC chip and the client can also be wire communications carried out by adoption of the contact technique in place of radio communications carried out by adoption of the non-contact technique.

It is also to be noted that, in this specification, processes of each flowchart described above can be carried out not only in a pre-prescribed order along the time axis, but also concurrently or individually.

Examples of processes carried out concurrently or individually are parallel processes and object-based processes.

What is claimed is:

1. A server connected by a communication network to a client for driving an IC chip which is coupled to the client, the server comprising:

a server control section configured to carry out predetermined processing of the IC chip by the server via the client in response to processing requests sent from the client to the server, the client not directly operating the IC chip, the processing including at least acquiring at the server data stored on said IC chip, said IC chip having a chip ID, and a command-group sender section configured to send to the client, with the same timing, both an IC chip processing command which commands the client to at least acquire data stored on the IC chip and an ID acquisition command, the ID acquisition command including ID location information causing the client to acquire the chip ID of said IC chip, based on the ID location information, and transmit the chip ID to the server, the command-group sender section being configured to respond to a request made by said client for predetermined processing of the data stored on the IC chip to provide a processing command with the acquired chip ID contained therein and to transmit the processing command with the acquired chip ID from said server to said client, wherein the server responds to the client's request for processing of the data stored on the IC chip to transmit the processing command to the client and the client relays the processing command to the IC chip such that the server controls, through the client, the predetermined processing of the data stored on the IC chip.

2. A program, embodied on a non-transitory computer readable medium, to be executed by a computer connected by a communication network to a client to drive an IC chip which is coupled to said client, said program executed by said computer to carry out a function of:

a server control section configured to carry out predetermined processing of the IC chi by the server via the client in response to processing requests sent from the client to the server, the client not directly operating the IC chip, the processing including at least acquiring at the server data stored on said IC chip, said IC chip having a chip ID, and a command-group sender section configured to send to the client, with the same timing, both an IC chip processing command which commands the client to at least acquire data stored on the IC chip and an ID acquisition command, the ID acquisition command including ID location information causing the client to acquire the chip ID of said IC chip, based on the ID location information, and transmit the chip ID to the server, the command-group sender section being configured to respond to a request made by said client for predetermined processing of the data stored on the IC chip to provide a processing command with the acquired chip ID contained therein and to transmit the processing command with the acquired chip ID from said command-group sender section to said client, wherein the server responds to the client's request for processing of the data stored on the IC chip to transmit the processing command to the client and the client relays the processing command to the IC chip such that the computer controls, through the client, the predetermined processing of the data stored on the IC chip.

3. An information processing method for providing support to an IC chip from a server through a client for driving said IC chip which is coupled to the client, to carry out predetermined processing of the IC chip by the server to at least acquire at the server data stored on said IC chip as support in execution of said predetermined processing, said IC chip having a chip ID, the processing of said IC chip being carried out by the server via the client in response to processing requests sent from the client to the server, the client not directly operating the IC chip, said information processing method comprising the step of:

transmitting to the client, with the same timing both an IC chip processing command which commands the client to at least acquire data stored on the IC chip and an ID acquisition command, the ID acquisition command including ID location information causing the client to acquire the chip ID of said IC chip, based on the ID location information, and transmit the chip ID to the server, responding to a request made by said client for predetermined processing of the data stored on the IC chip to provide a processing command with the acquired chip ID contained therein, and transmitting the processing command with the acquired chip ID from the server to said client, wherein the server responds to the client's request for processing of the data stored on the IC chip to transmit the processing command to the client and the client relays the processing command to the IC chip such that the predetermined processing of the data stored on the IC chip is controlled by the IC chip processing command from the server through the client.

* * * * *